(12) United States Patent
Harder, Sr.

(10) Patent No.: US 10,219,503 B1
(45) Date of Patent: Mar. 5, 2019

(54) FISHING ROD SECURING ASSEMBLY

(71) Applicant: Steven L. Harder, Sr., Hopewell, VA (US)

(72) Inventor: Steven L. Harder, Sr., Hopewell, VA (US)

( * ) Notice: Subject to any disclaimer, the term of this patent is extended or adjusted under 35 U.S.C. 154(b) by 0 days.

(21) Appl. No.: 15/921,082

(22) Filed: Mar. 14, 2018

(51) Int. Cl.
*F16M 13/00* (2006.01)
*A01K 97/10* (2006.01)
*F16B 7/18* (2006.01)
*F16B 5/02* (2006.01)
*B63B 35/73* (2006.01)
*F16B 5/12* (2006.01)

(52) U.S. Cl.
CPC ............. *A01K 97/10* (2013.01); *B63B 35/73* (2013.01); *F16B 5/02* (2013.01); *F16B 5/123* (2013.01); *F16B 7/187* (2013.01); *B63B 2035/738* (2013.01)

(58) Field of Classification Search
USPC ......................................................... 248/512
See application file for complete search history.

(56) References Cited

U.S. PATENT DOCUMENTS

| 3,184,192 A * | 5/1965 | Hoerr | A01K 97/10 248/298.1 |
|---|---|---|---|
| 3,444,643 A * | 5/1969 | Dobbs | A01K 97/10 248/514 |
| 3,870,259 A | 3/1975 | Reynolds | |
| 4,157,804 A | 6/1979 | Byford | |
| 4,388,774 A * | 6/1983 | Thoemke | A01K 91/08 114/255 |
| 4,650,146 A * | 3/1987 | Duke | A01K 97/10 248/129 |
| 4,869,195 A * | 9/1989 | Eichfeld | A01K 97/10 114/255 |
| 5,014,458 A * | 5/1991 | Wagner | A01K 97/10 43/21.2 |
| 5,249,722 A * | 10/1993 | Horn | B60R 7/14 211/64 |
| 5,435,093 A | 7/1995 | Minories | |
| 5,438,789 A * | 8/1995 | Emory | A01K 97/10 248/514 |
| 5,557,877 A * | 9/1996 | Colson | A01K 97/10 248/512 |
| 5,595,333 A * | 1/1997 | Boston | B60R 7/14 211/60.1 |
| 5,685,107 A * | 11/1997 | Sweet | A01K 97/10 43/21.2 |
| 5,987,804 A * | 11/1999 | Shearer | A01K 97/10 43/21.2 |
| 6,213,441 B1 * | 4/2001 | Baynard | A01K 97/10 248/512 |
| 6,289,627 B1 | 9/2001 | Gibbs | |

(Continued)

*Primary Examiner* — Monica E Millner

(57) ABSTRACT

A fishing rod securing assembly for holding a fishing rod on a boat includes a tube that has a top wall, a bottom wall, a first lateral wall, a second lateral wall, a first end and a second end. The tube is elongated from the first end to the second end. The tube has a slot that extends through the top wall and into an interior of the tube. The slot is elongated. A plurality of fishing rod holders is included wherein each of the holders extends upwardly through the slot and is movable along the slot. A connecting fastener extends through the tube and extends into a boat to secure the tube to the boat.

8 Claims, 5 Drawing Sheets

(56) References Cited

U.S. PATENT DOCUMENTS

| | | | |
|---|---|---|---|
| 6,568,648 B1 * | 5/2003 | Ray | A01K 97/10 248/538 |
| 6,591,541 B1 * | 7/2003 | Cummings | A01K 97/10 248/514 |
| 6,718,682 B1 * | 4/2004 | Seitsinger | A01K 97/10 248/513 |
| 6,796,078 B1 * | 9/2004 | Bowman | A01K 97/10 211/70.8 |
| 6,962,018 B1 | 11/2005 | King | |
| 7,043,869 B1 * | 5/2006 | Hubbard | A01K 97/10 43/21.2 |
| 7,114,281 B2 * | 10/2006 | Miller | A01K 97/10 43/21.2 |
| 7,331,139 B2 * | 2/2008 | Moses | A01K 97/10 211/70.8 |
| 7,530,324 B2 * | 5/2009 | Salerno | A01K 97/10 114/364 |
| 7,941,964 B2 * | 5/2011 | Stanton | A01K 97/10 248/512 |
| 8,453,373 B2 * | 6/2013 | Gordon | A01K 97/10 248/534 |
| D756,684 S * | 5/2016 | Carr | D6/552 |
| 9,782,000 B2 * | 10/2017 | Kahle | A47B 81/005 |
| 2005/0178041 A1 | 8/2005 | Zaffiro | |

* cited by examiner

FISHING ROD SECURING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to rod holding devices and more particularly pertains to a new rod holding device for holding a fishing rod on a boat.

BRIEF SUMMARY OF THE INVENTION

An embodiment of the disclosure meets the needs presented above by generally comprising a tube that has a top wall, a bottom wall, a first lateral wall, a second lateral wall, a first end and a second end. The tube is elongated from the first end to the second end. The tube has a slot that extends through the top wall and into an interior of the tube. The slot is elongated. A plurality of fishing rod holders is included wherein each of the holders extends upwardly through the slot and is movable along the slot. A connecting fastener extends through the tube and is configured to extend into a boat to secure the tube to the boat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
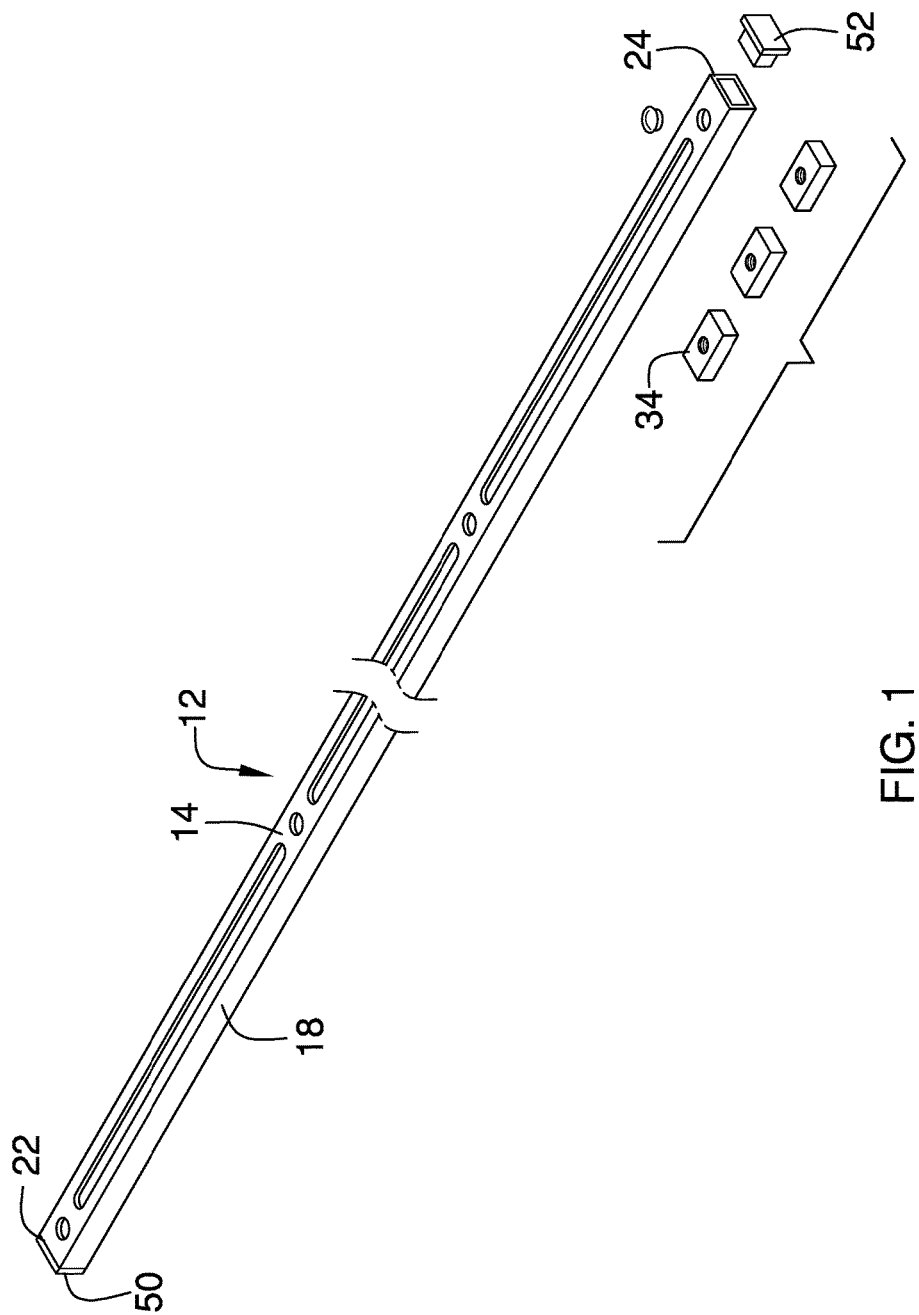
FIG. 1 is a top side view of a fishing rod securing assembly according to an embodiment of the disclosure.
Figure 2:
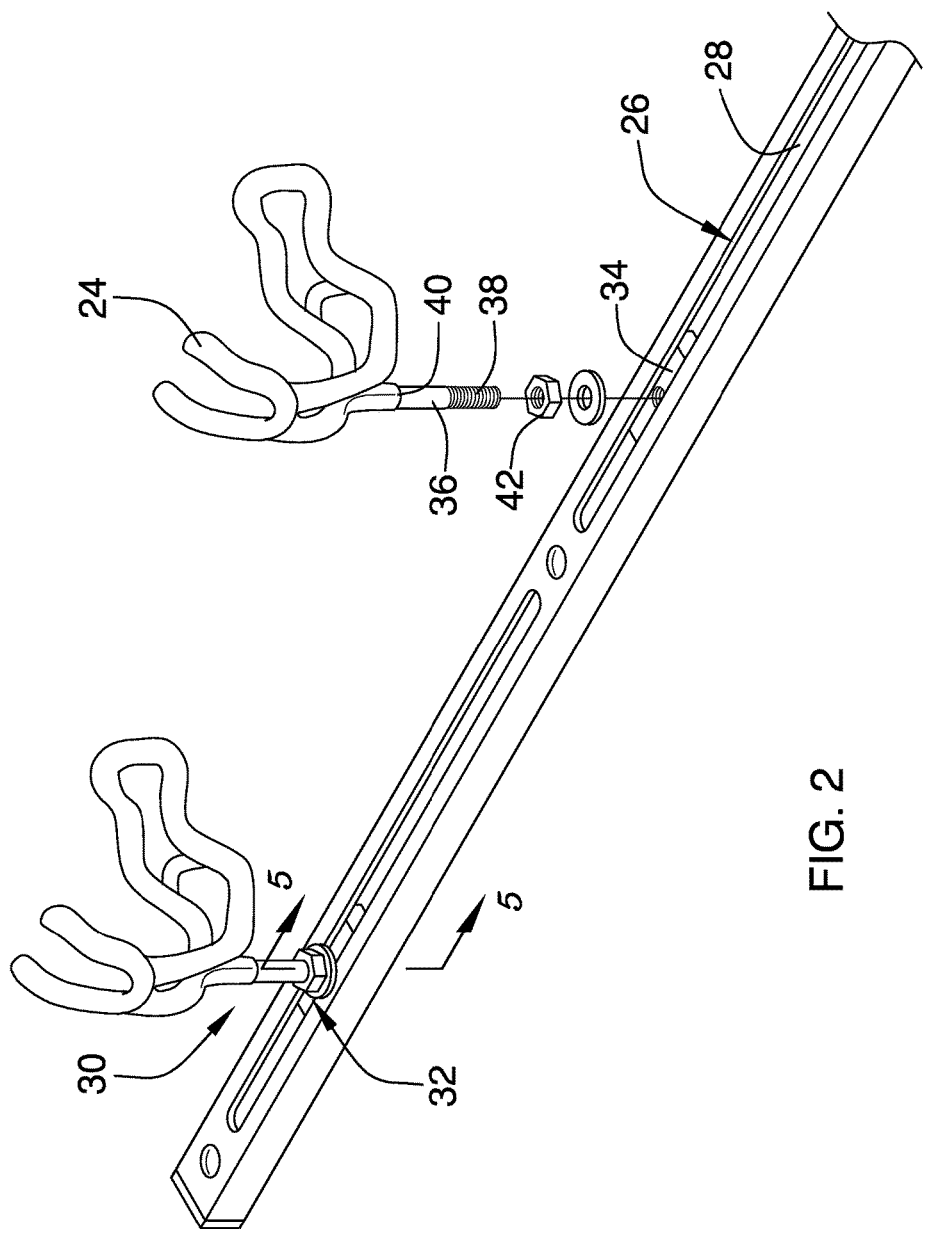
FIG. 2 is a top side view of an embodiment of the disclosure.
Figure 3:
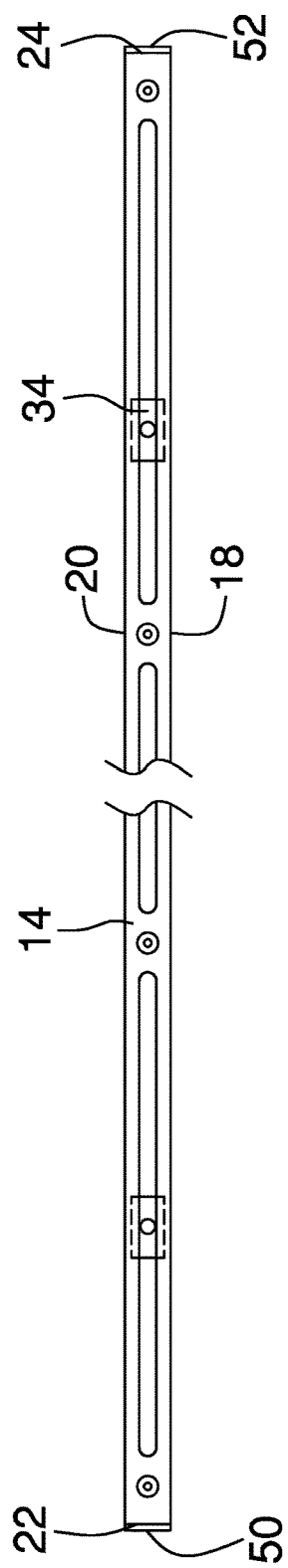
FIG. 3 is a top view of an embodiment of the disclosure.
Figure 4:
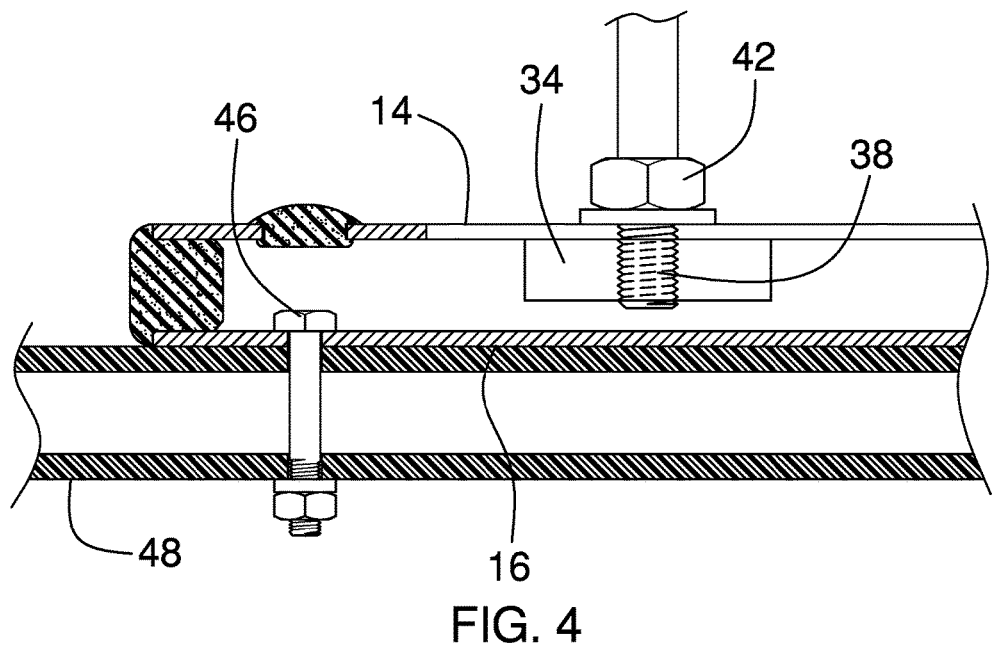
FIG. 4 is a cross-sectional view of an embodiment of the disclosure taken along line 4-4 of FIG. 6.
Figure 5:
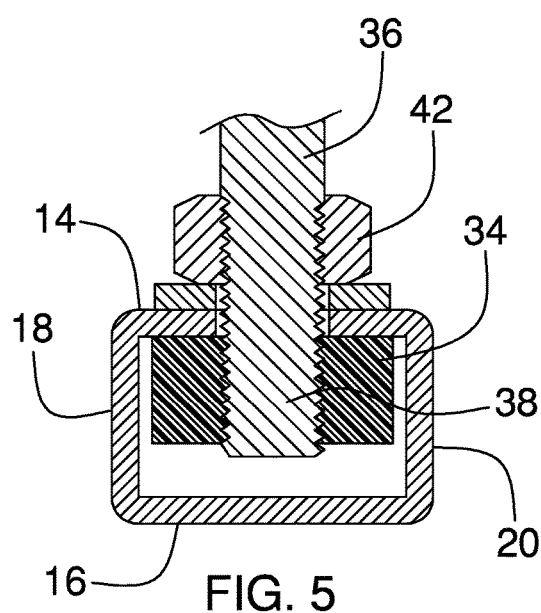
FIG. 5 is a cross-sectional view of an embodiment of the disclosure taken along line 5-5 of FIG. 2.
Figure 6:
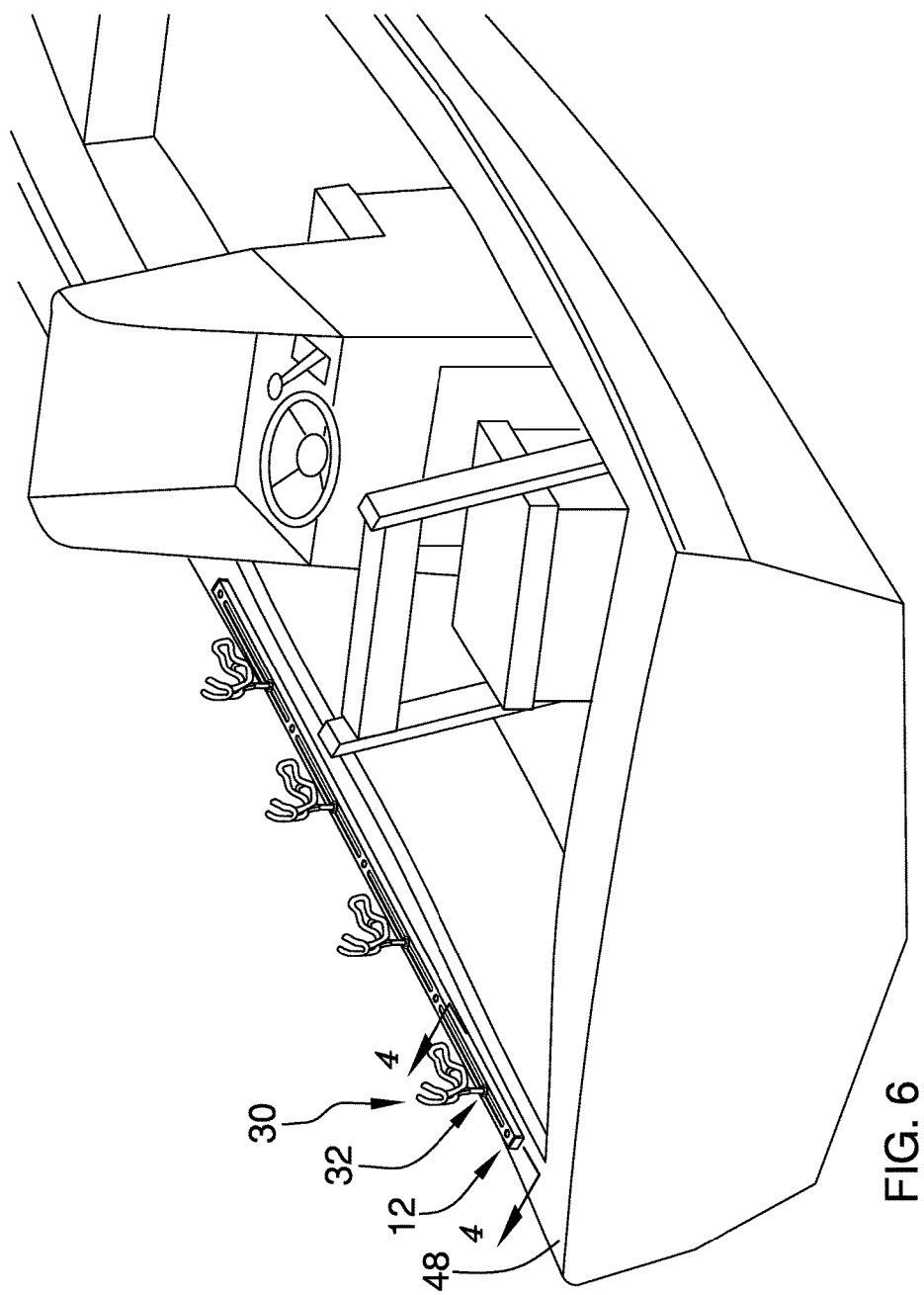
FIG. 6 is a top side view of an embodiment of the disclosure.

With reference now to the drawings, and in particular to FIGS. 1 through 6 thereof, a new rod holding device embodying the principles and concepts of an embodiment of the disclosure and generally designated by the reference numeral 10 will be described.

As best illustrated in FIGS. 1 through 6, the fishing rod securing assembly 10 generally comprises a tube 12 that has a top wall 14, a bottom wall 16, a first lateral wall 18, a second lateral wall 20, a first end 22 and a second end 24. The tube 12 is elongated from the first end 22 to the second end 24. The tube 12 has a slot 26 that extends through the top wall 14 and into an interior 28 of the tube 12. The slot 26 is elongated. The tube 12 has a rectangular cross-sectional taken perpendicular to a longitudinal axis that extends through the first and second ends.

A plurality of fishing rod holders 30 is included wherein each of the fishing rod holders 30 extends upwardly through the slot 26 and is movable along the slot 26. Each of the fishing rod holders 30 includes a mount 32 that is positioned in the tube 12 and is slideable between the first and second ends 22, 24. The mount 32 extends upwardly through the slot 26.

The mount 32 includes a retention member 34 that is positioned within the tube 12. The retention member 34 has a size greater than a width of the slot 26. A post 36 extends through the retention member 34 and upwardly through the slot 26. The post 36 has a bottom end 38 and an upper end 40. The post 36 is threaded adjacent to the bottom end 38 and is threadably engaged with the retention member 34. A locking fastener 42 is threadably coupled to the post 36. The locking fastener 42 is positioned above the top wall 14 and releasably locks a position of the post 36 relative to the tube 12. A fishing rod saddle 44 is attached to the mount 32 and is positioned above the top wall 14 of the tube 12. The fishing rod saddle 44 is attached to the upper end 40 of the post 36.

A connecting fastener 46 extends through the tube 12 and extends into a boat 48 to secure the tube 12 to the boat 48. The bottom wall 16 of the tube 12 may abut the boat 48 when the connecting fastener 46 secures the tube 12 thereto. The connecting fastener 46 may comprise a bolt, but should not be limited to such. A pair of end caps 50, 52 is included. The pair of end caps 50, 52 includes a first end cap 50 and a second end cap 52. The first end cap 52 is positionable on the first end 22 and the second end cap 52 is positionable on the second end 24 to inhibit the retention member 34 from exiting the tube 12.

In use, the tube 12 is secured to the boat 48. The retention member 34 is selectively positioned in the tube 12. The post 36 is attached to the retention member 34 and the locking fastener 42 is attached to the post 36 to facilitate coupling the post 36 to the retention member 34. Once the fishing rod holder 30 has been selectively positioned on the tube 12 a fishing rod is mounted to the fishing rod saddle 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing rod holding assembly comprising:
   a tube having a top wall, a bottom wall, a first lateral wall, a second lateral wall, a first end and a second end, said tube being elongated from said first end to said second end, said tube having a slot extending through said top wall and into an interior of said tube, said slot being elongated;
   a plurality of fishing rod holders, each of said holders extending upwardly through said slot and being movable along said slot; and
   a connecting fastener extending through said tube and being configured to extend into a boat to secure said tube to the boat;
   each of said fishing rod holders including a mount being positioned in said tube and being slidable between said first and second ends, each said mount extending upwardly through said slot, each said mount comprising
      a retention member being positioned within said tube,
      a post extending through said retention member and upwardly through said slot, said post having a bottom end and an upper end, said post being threaded adjacent to said bottom end and being threadably engaged with said retention member, and
      a locking fastener being threadably coupled to said post, said locking fastener being positioned above said top wall and rotatable on said post in a selectable direction wherein said locking fastener is adjustable towards said retention member to releasably lock a position of said post relative to said tube and such that said rod holder is securable to said tube facing a selectable direction when said locking fastener is fully tightened to urge said retention member against said tube whereby said fishing rod holder is secured in a static position relative to said tube.

2. The fishing rod holding assembly according to claim 1, wherein said tube has a rectangular cross-sectional taken perpendicular to a longitudinal axis extending through said first and second ends.

3. The fishing rod holding assembly according to claim 1, wherein said retention member has a size greater than a width of said slot.

4. The fishing rod holding assembly according to claim 1, wherein said fishing rod holder further includes a fishing rod saddle being attached to said mount and being positioned above said top wall of said tube.

5. The fishing rod holding assembly according to claim 4, wherein said fishing rod saddle is attached to said upper end of said post.

6. The fishing rod holding assembly according to claim 5, further including a pair of end caps including a first end cap and a second end cap.

7. The fishing rod holding assembly according to claim 6, wherein said first end cap is positionable on said first end and said second end cap is positionable on said second end inhibiting said retention member from exiting said tube.

8. A fishing rod holding assembly comprising:
   a tube having a top wall, a bottom wall, a first lateral wall, a second lateral wall, a first end and a second end, said tube being elongated from said first end to said second end, said tube having a slot extending through said top wall and into an interior of said tube, said slot being elongated, said tube having a rectangular cross-sectional taken perpendicular to a longitudinal axis extending through said first and second ends;
   a plurality of fishing rod holders, each of said holders extending upwardly through said slot and being movable along said slot, each of said fishing rod holders including:
      a mount being positioned in said tube and being slidable between said first and second ends, said mount extending upwardly through said slot, said mount including:
         a retention member being positioned within said tube, said retention member having a size greater than a width of said slot;
         a post extending through said retention member and upwardly through said slot, said post having a bottom end and an upper end, said post being threaded adjacent to said bottom end and being threadably engaged with said retention member;
         a locking fastener being threadably coupled to said post, said locking fastener being positioned above said top wall and rotatable on said post in a selectable direction wherein said locking fastener is adjustable towards said retention member to releasably lock a position of said post relative to said tube and such that said rod holder is securable to said tube facing a selectable direction when said locking fastener is fully tightened to urge said retention member against said tube whereby said fishing rod holder is secured in a static position relative to said tube;
      a fishing rod saddle being attached to said mount and being positioned above said top wall of said tube, said fishing rod saddle being attached to said upper end of said post;
   a connecting fastener extending through said tube and being configured to extend into a boat to secure said tube to the boat; and a pair of end caps including a first end cap and a second end cap, said first end cap being positionable on said first end and said second end cap being positionable on said second end inhibiting said retention member from exiting said tube.

* * * * *